Nov. 12, 1940.    J. W. FOLEY    2,221,514
ROLLER BEARING
Filed May 13, 1940

Inventor
John W. Foley
By [signature]
Atty.

Patented Nov. 12, 1940

2,221,514

UNITED STATES PATENT OFFICE 2,221,514

ROLLER BEARING

John W. Foley, Chicago, Ill.

Application May 13, 1940, Serial No. 334,838

5 Claims. (Cl. 308—206)

This invention relates to improvements in roller bearings of the type embodying an inner and an outer bearing ring, between which ring rollers are arranged, and these rollers each rotate on an inclined axis, the rollers being of a tapering configuration.

Such a bearing has usually been provided with a rib or high portion around the inner ring adjacent the inner ends of the rollers.

It has been found that in use the constant action or binding of the rollers on such ribs or high points results in a crystallization of the metal, or a wearing or breaking down of the portion of the body member adjacent the inner end of the rollers.

It is one of the objects of the present invention to overcome these difficulties and objections and to provide a floating rib against which the inner ends of the rollers operate, with the result that the life of the parts will be prolonged and the support or bearing for the inner ends of the rollers will not be damaged.

A further object is to provide in a bearing of this character rollers which are shaped and arranged that one extremity thereof will project beyond the respective member of the inner ring, to contact a floating rib disposed between such members, the floating rib comprising a floating member upon which a plurality of rollers are supported for movement therewith and with respect thereto.

Figure 1:
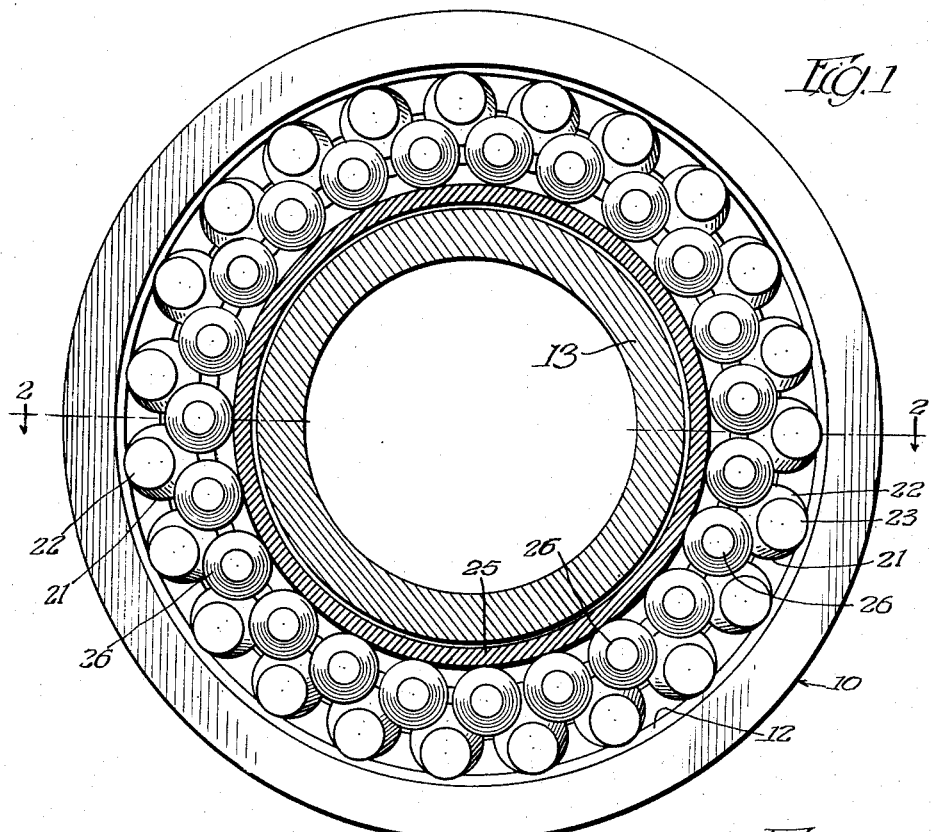

To the attainment of these ends and the accomplishment of other new and useful objects as will appear, the invention consists in the features of novelty in substantially the construction, combination and arrangement of the several parts hereinafter more fully described and claimed and shown in the accompanying drawing illustrating this invention, and in which Figure 1 is a sectional view taken on line 1—1 Figure 2 of a bearing of this character constructed in accordance with the principles of this invention.

Figure 2:
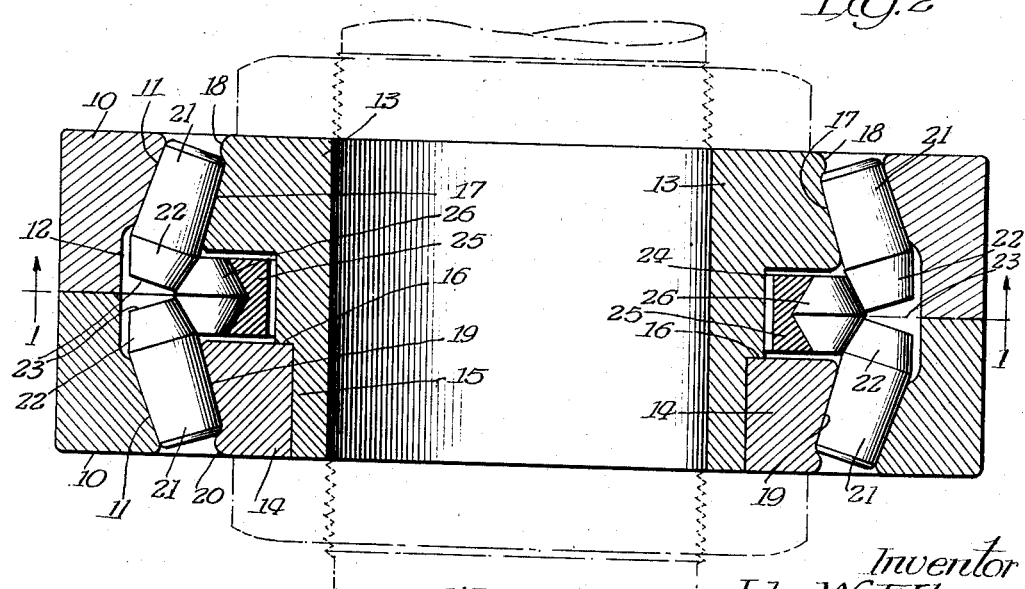

Figure 2 is a horizontal view taken on line 2—2 Figure 1.

The bearing consists essentially of an outer ring and an inner ring. The outer ring 10 is preferably constructed of two members each of which is provided with an inclined bearing surface 11. These bearing surfaces 11 terminate short of each other adjacent the longitudinal center of the member to provide a space 12.

The inner ring is also preferably constructed of two members 13—14, the member 14 being telescoped or sleeved upon a reduced portion 15 of the member 13 to abut a shoulder 16. The member 13 is provided with a bearing surface 17 which inclines downwardly from the longitudinal center of the member towards the end thereof and terminates short of the end of the member to form a shoulder 18. Similarly the member 14 is provided with a bearing surface 19 inclining downwardly from the center of the ring towards the outer face thereof to form a shoulder 20.

Between the co-operating bearing surfaces 11—17 and 11—19 are arranged rollers 21 which preferably taper from one end toward the other. The inner extremity of each of the rollers 21 is formed into a tapering or conical portion 22, the extremity of these conical portions being preferably straight, as at 23, and terminates short of each other, and are disposed in the space 12.

There is formed between the members 13—14 of the inner ring a recess 24, and within this recess is arranged a floating inner bearing ring 25. Supported by the bearing ring 25 are rollers 26 and these rollers taper from the diametric center thereof towards the opposite ends to form opposed conical portions, the base of these portions being disposed in alinement with the space between the extremities 23 of the adjacent rollers 21.

The rollers 21 are of such a length that the tapered extremities 22 thereof will project beyond the inner face or ends of the bearing surfaces 17—19 so as to contact the rollers 26 carried by the floating ring 25.

With this construction it will be manifest that the ends of the rollers 21 will not contact or bear against a resisting rib, and which ribs cause a slippage of the roller with respect thereto, which is stationary with respect to the rollers as the rollers themselves rotate about their axes.

With the present invention and by providing the floating ring 25 with the rollers 26 that are mounted thereupon for rotation therewith, and with respect thereto, it will be manifest that the ends or extremities 22 of the rollers 21 will not only contact with the rollers 26 but the bearing surfaces of the rollers 21 against the rollers 26 will be beyond the lateral face or end of the bearing surfaces 17—19 on the inner ring members. This is advantageous because the contact will be against the high part of the roller and the load stresses and strains will not be exerted upon the edges or ends of the bearing surfaces 17—19.

This will materially reduce the wear of the roller bearings 21 on such bearing surfaces and will prolong the life of the bearing.

While the preferred form of the invention has been herein shown and described, it is to be understood that various changes may be made in the details of construction and in the combination and arrangement of the several parts, within the scope of the claims, without departing from the spirit of this invention.

What is claimed as new is:

1. A roller bearing embodying an outer and an inner ring, rollers disposed between said rings, said inner ring embodying two members, the rollers contacting surfaces on said rings being inclined downwardly with respect to the axis of the rings in directions from the center to the ends thereof, a floating bearing ring between the members of the inner ring, and rollers supported by the said floating ring and contacting the inner ends of the first said rollers.

2. A roller bearing embodying an outer and an inner ring, rollers disposed between said rings, said inner ring embodying two members, the rollers contacting surfaces on said rings being inclined downwardly with respect to the axis of the rings in directions from the center to the ends thereof, a floating bearing ring between the members of the inner ring, and rollers supported by the said floating ring and contacting the inner ends of the first said rollers, the ends of the first said rollers which contact the rollers carried by said floating ring being tapered.

3. A roller bearing embodying an outer and an inner ring, rollers disposed between said rings, said inner ring embodying two members, the rollers contacting surfaces on said rings being inclined downwardly with respect to the axis of the rings in directions from the center to the ends thereof, a floating bearing ring between the members of the inner ring, and rollers supported by the said floating ring and contacting the inner ends of the first said rollers, the ends of the first said rollers which contact the rollers carried by said floating ring being tapered, the said tapered extremities of the rollers projecting beyond the proximate lateral faces of the roller bearing of the member of the inner ring.

4. A roller bearing embodying an outer and an inner ring, rollers disposed between said rings, said inner ring embodying two members, the rollers contacting surfaces on said rings being inclined downwardly with respect to the axis of the rings in directions from the center to the ends thereof, a floating bearing ring between the members of the inner ring, and rollers supported by the said floating ring and contacting the inner ends of the first said rollers, the rollers which are supported by said floating ring being tapered from the longitudinal center thereof in opposite directions and toward the ends thereof.

5. A roller bearing embodying an outer and an inner ring, rollers disposed between said rings, said inner ring embodying two members, the rollers contacting surfaces on said rings being inclined downwardly with respect to the axis of the rings in directions from the center to the ends thereof, a floating bearing ring between the members of the inner ring, and rollers supported by the said floating ring and contacting the inner ends of the first said rollers, the rollers which are supported by said floating ring being tapered from the longitudinal center thereof in opposite directions and toward the ends thereof, the inner extremities of the first said rollers being tapered and contacting the respective portions of the rollers that are carried by said floating ring.

JOHN W. FOLEY.